May 11, 1954 R. N. WORREST 2,677,919
APPARATUS FOR COOLING NEWLY MOLDED GLASSWARE
Filed June 30, 1947 2 Sheets-Sheet 1
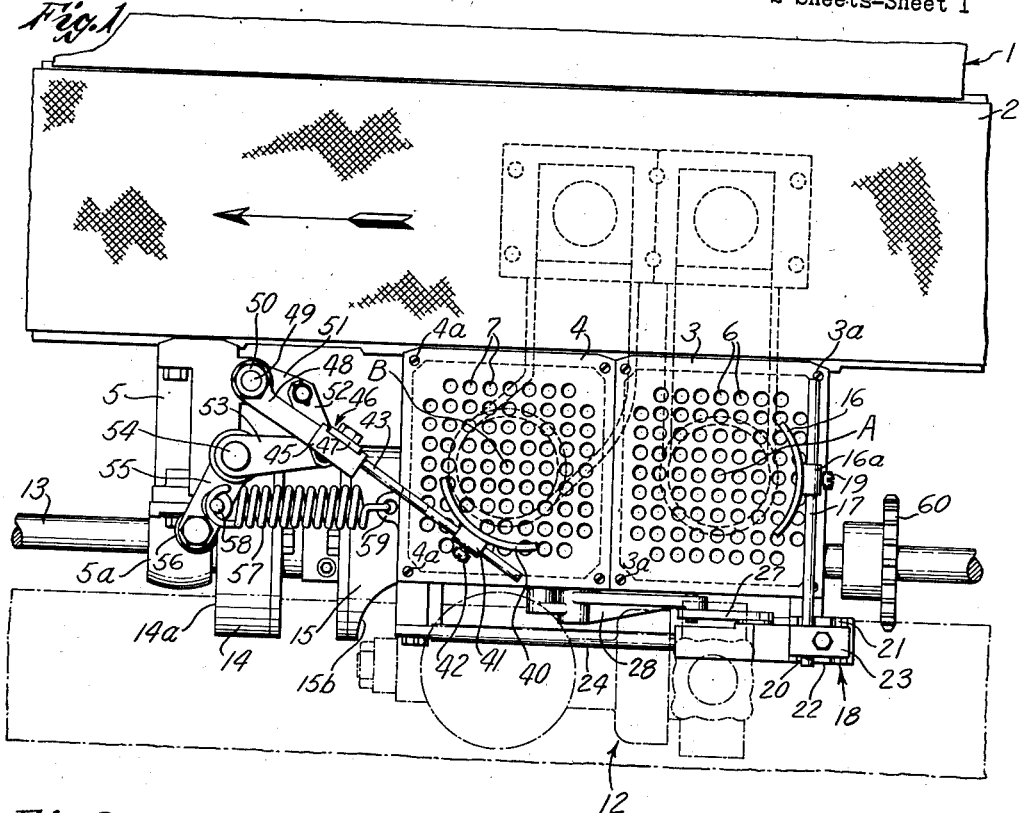
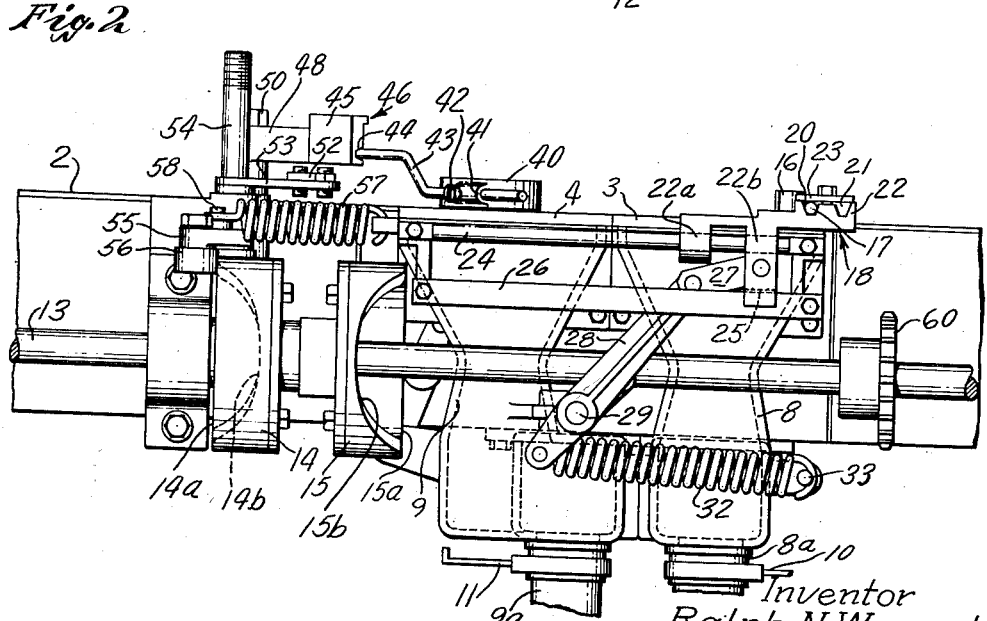
Inventor
Ralph N. Worrest
by Parham & Bates
Attorneys May 11, 1954  R. N. WORREST  2,677,919
APPARATUS FOR COOLING NEWLY MOLDED GLASSWARE
Filed June 30, 1947  2 Sheets-Sheet 2
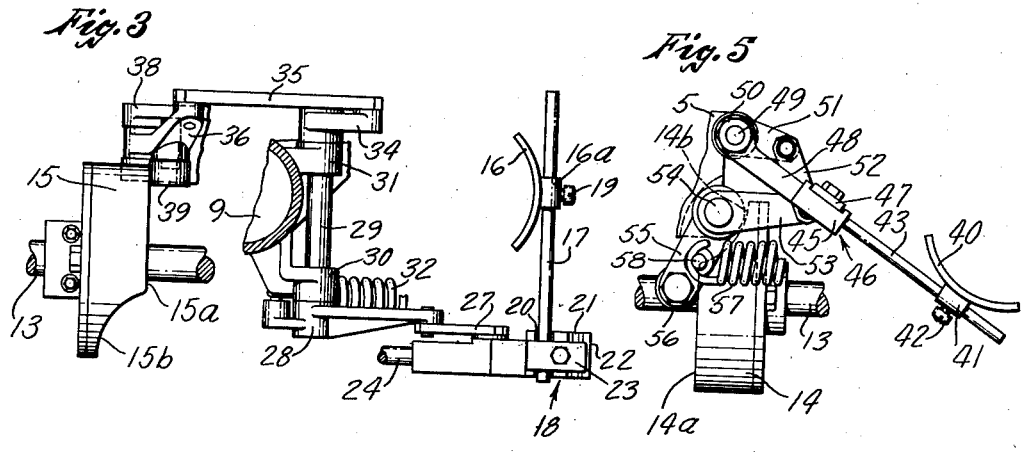
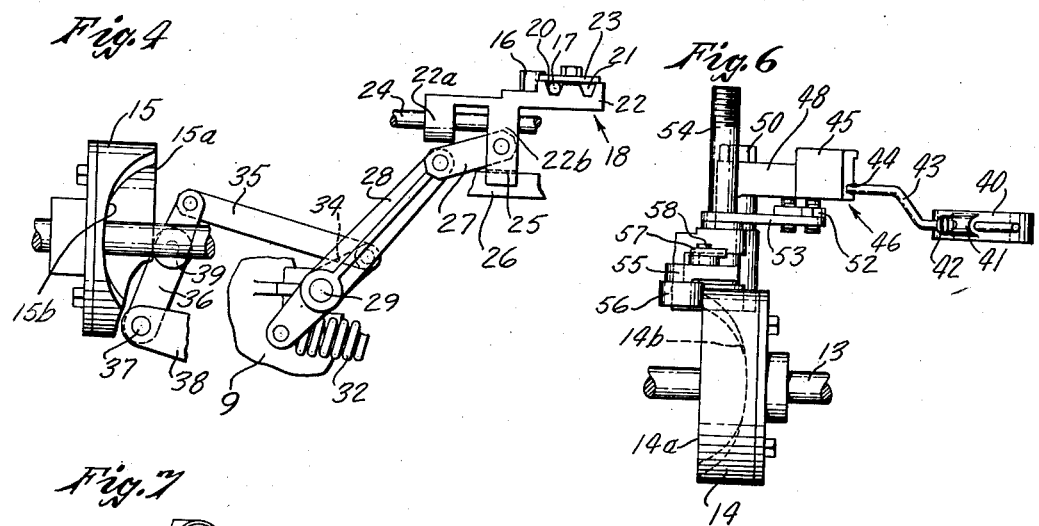
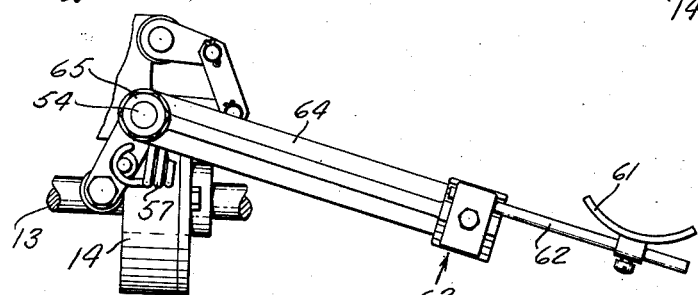
Inventor
Ralph N. Worrest
by Parham + Bates
Attorneys Patented May 11, 1954

2,677,919

UNITED STATES PATENT OFFICE 2,677,919

APPARATUS FOR COOLING NEWLY MOLDED GLASSWARE

Ralph N. Worrest, West Hartford, Conn., assignor to Emhart Manufacturing Company, a corporation of Delaware Application June 30, 1947, Serial No. 758,054

4 Claims. (Cl. 49—47)

This invention relates generally to the manufacture of glassware and more particularly to the handling and treatment of newly formed glassware as it comes from the molds of a forming machine and is in the course of delivery to a conveyor for taking it to a heat treating apparatus, such, for example, as a lehr.

In the manufacture of glassware, such as bottles, the ware is formed of plastic glass having a high temperature. In the final mold of the forming machine, the hot glass is expanded to the shape of the mold wall and enough heat is extracted from the glass by the mold so that the formed article is at least temporarily form retaining, as for the period of time required for the taking of this article from the mold and depositing it on an adjacent support. The ware also may be internally cooled during part of the mold contact time to aid at setting up the article. However, present day demands in the manufacture of glassware require or make desirable removal of articles from the final molds of the forming machine at the ends of mold contact periods too short for extraction of enough heat from the molded glass to assure that a molded article will retain its shape if the heat remaining in the wall thereof has an opportunity to distribute itself so as to soften the temporarily stiffer outer surface layer of glass of the article wall. It is customary in the operation of one type of commercial glassware forming machine, known as the Hartford I. S. Machine, with which the present invention is particularly well adapted for use although not limited thereto, to take the formed articles of glassware out of a forming mold by a take-out means which lowers each formed article onto a perforated dead plate adjacent the mold so as to set the article down in an upward blast of cooling air supplied through the perforations of the dead plate. The operation of delivering a newly formed article of glassware onto such a dead plate, cooling it thereon, and then transferring it to an adjacent conveyor for transportation to a lehr, and the structure involved in these operations, are disclosed in Patent No. 1,921,390 of August 8, 1933 to Ingle. The present invention provides an improvement over the apparatus for cooling and handling newly molded glassware disclosed by that patent.

An object of the present invention is to improve the prior practice above described by providing conditions and a mode of operation such that the period of necessary stay of each newly molded article of glassware at the dead plate cooling station to which it is delivered from the forming mold may be substantially reduced, whereby a corresponding increase in the production of glassware by the mold may be effected.

A more specific object of the invention is to provide for required cooling of the newly made article in two successive stages at two different dead plate stations, respectively, whereby two successively produced articles coming from the same mold may both be undergoing cooling on the dead plate while a third article is still in the mold.

A further object of the invention is to provide for the positioning of newly molded glassware at two different stations successively and removal of the glassware from the second station to an adjacent conveyor, whereby a wide variety of specifically different treatments of the glassware may be effected in the interval between the removal of the glassware from the forming mold and its delivery to the conveyor. Thus, the glassware may be cooled by forced cooling at the first station and its treatment at the second station may include a different treatment thereof, such as fire finishing, internal cooling, tempering, inspection for "spikes" or other defects.

A still further object of the invention is to provide for appropriate cooling of newly formed glassware at one or both of two adjacent dead plate stations together with transfer of the treated article to an adjacent conveyor from either of such stations, according to the position of the article at the time the treatment has been completed.

In carrying out the present invention, I may provide a dead plate suitably related in position to a forming mold of a forming machine and comprising two adjacent perforated sections, each of which provides a cooling station for glassware. The usual take-out means of the forming machine may be employed to take out each newly formed article from the mold and to deliver such article onto one of the dead plate sections at the cooling station thereon. The latter part of this delivery may bring the article into an upwardly directed body or blast of cooling air emanating from the perforations of the dead plate section. After a predetermined period of cooling on that dead plate section, the article may be moved laterally by an appropriately timed article transfer means to a second cooling station on the second dead plate section where the article may be subjected to further forced cooling. Thereafter, a second suitably timed article transfer means may operate to transfer the article onto an adjacent conveyor.

In some instances, the glassware being produced may be such that sufficient cooling in the time available can be effected at the first cooling station. The apparatus of the present invention preferably includes transfer means of such a character that articles of glassware may be moved from the first cooling station directly onto the conveyor when desired.

It will be noted that in the carrying out of the invention by an apparatus such as generally described, each article of glassware, when on the second cooling section of the dead plate, is advantageously positioned for any treatment thereof other or in addition to forced cooling that is desired and feasible at this stage of glassware manufacture, this without interference with the usual take-out means by which glassware may be delivered to the first cooling section of the dead plate.

Other objects and advantages of the invention will hereinafter be pointed out or will become apparent from the following description of a practical embodiment thereof, as shown in the accompanying drawings, in which:

Fig. 1 is a plan view of a plural section cooling dead plate and associate parts of applicant's novel apparatus for dealing with newly molded glassware;

Fig. 2 is a side elevation of the apparatus shown in Fig. 1;

Fig. 3 is a fragmentary plan view of the elements of a transfer mechanism for moving an article of glassware from the first cooling dead plate section to the second section, with other parts of the apparatus omitted;

Fig. 4 is a side elevation of the glassware transfer mechanism shown in Fig. 3;

Fig. 5 is a view similar to Fig. 4 but showing the transfer mechanism for moving an article of glassware from the second cooling dead plate section to the adjacent conveyor, the latter not being shown;

Fig. 6 is a side elevation of the transfer mechanism shown in Fig. 5; and

Fig. 7 is a view like Fig. 5 but showing the transfer mechanism after it has been adapted by the application thereto of a relatively long transfer arm to move an article of glassware from the first cooling dead plate section onto the conveyor.

Referring now to the drawings and more particularly to Fig. 1, the number 1 designates generally a stationary frame structure, only a fragmentary portion of which is shown, and 2 indicates a horizontally disposed, rectilinearly movable conveyor supported thereby. The conveyor may be constructed and operated as disclosed in the aforesaid Ingle Patent 1,921,390 or any other suitable known conveyor may be employed.

At one side of the conveyor 2 and at substantially the same level is a horizontally disposed dead plate comprising sections 3 and 4, respectively, disposed side by side in suitable relation to the conveyor. The dead plate sections 3 and 4 have numerous perforations therethrough, as indicated at 6 and 7, respectively. These dead plate sections are located over and may constitute the tops of cooling air ducts 8 and 9, shown in Fig. 2, and may be fastened in place on the ducts, as by screws 3a and 4a, Fig. 1. Cooling air under pressure may be supplied to the ducts 8 and 9 by supply pipes 8a and 9a, respectively, each of which may be provided with a gate, as indicated at 10 for the pipe 8a and at 11 for the pipe 9a, Fig. 2, or with any other suitable known cooling fluid flow control means. The cooling fluid passing through the perforations in the dead plate sections from the underneath ducts may thus be independently regulated and controlled.

The dead plate section 3 provides a cooling station, designated A, for an article of glassware (not shown) which may be delivered thereto when taken out of a mold of an adjacent forming machine (not shown) by any suitable taking machine (not shown), as by the take-out mechanism of out mechanism, as by the take-out mechanism of the Hartford I. S. Machine, as shown in the Ingle Patent 1,911,119 of May 23, 1933, and represented by the diagrammatic dot-and-dash line showing generally indicated at 12 in Fig. 1. The dead plate section 3 and the station A will sometimes be referred to herein as the first dead plate section and the first cooling station. Similarly, the dead plate section 4 will sometimes be referred to herein as the second dead plate section and a cooling station, indicated at B, Fig. 1, as the second dead plate station.

A horizontally disposed cam shaft 13 extends parallel with the conveyor 2 but at a lower level, passing in part beneath the dead plate sections 3 and 4 and is rotatably supported in any suitable known way, as by bearings such as that indicated at 5a, Fig. 1, on a bracket or frame structure 5. The cam shaft 13 carries cams 14 and 15, respectively. Each may be a generally cylindrical member rotated by the shaft about the axis of the latter and having an endless cam edge surface, comprising a "dwell" portion lying in the same vertical plane, and a reentrant, arcuately curved camming portion, as indicated at 14a and 14b, respectively, for the cam 14 and at 15a and 15b, respectively, for the cam 15. These cams control the movements of article transfer mechanisms which will now be described.

The article transfer mechanism for transferring an article of glassware from station A to station B, Fig. 1, comprises an article contact element, shown as an arcuately curved, horizontally disposed bar 16, Figs. 1, 2, 3 and 4, carried by a transversely extending rod 17 projecting from a holder 18 that is mounted for reciprocatory movements adjacent to the dead plate section 3 at the side of the latter opposite the conveyor 2. The article contact element 16 has an attaching collar or sleeve 16a on the middle part of its back. The rod 17 extends through this attaching collar or sleeve and a set screw 19 or other fastening means may be provided to fasten the contact element 16 to the rod 17 in adjusted position on the latter. The end portion of the rod 17 remote from the conveyor 2 lies in one or the other of two transverse grooves, designated 20 and 21, respectively, in the top of a block 22 which is included in the holder 18. A clamping plate 23 secures the rod 17 in place in its groove in the top of the block 22. The purpose of having a plurality of the grooves in the block 22 is to locate the contact element 16 at different distances from the center of the station A when in a retracted position so as to vary the position of the path of the working stroke of the contact element 16 along a line parallel with the conveyor 2, whereby to adapt the transfer mechanism for use at different times with articles of glassware of different sizes. The contact element 16 conforms more or less in curvature to that of a portion of an article of glassware, such as a bottle or jar, to be moved thereby during operation of the transfer mechanism.

The block 22 has depending lugs 22a and 22b, respectively, which are suitably apertured to slide on a fixed horizontally disposed guide rod 24, as are best seen in Fig. 2. One of these lugs, as the lug 22b, depends below the other lug and has its lower end face portion grooved, as indicated at 25, to straddle and slidably engage a fixed, horizontally disposed guide bar 26, also as shown in Fig. 2. A link 27 operatively connects the lug 22b with one end of a bell crank lever 28 on a transverse rock shaft 29. The latter is supported to rock in bearings 30 and 31, respectively, which may comprise a portion of or be connected with the supporting air duct structure 9. A coil spring 32 operatively connects the bell crank lever 28 at its second end with a fixed anchoring member 33 so as to tend to swing the bell crank lever counterclockwise from the position shown in Figs. 1 to 4, inclusive, and best seen in Fig. 2, so as to move the holder 13 and the article contact element 16 carried thereby across the station A toward the station B on the second dead plate section. The operating strokes or movements of the transfer contact element 16 by the spring 32 is under the control of the cam 15 by reason of an operative connection between the rock shaft 29 and that cam. This is provided by an arm 34 on the rock shaft connected by a link 35 with one end of a lever 36 which is pivotally supported at its other end on a horizontal pivot element 37 in a fixed support element 38 and carries a cam follower 39 bearing against the cam surface of the cam 15. See Figs. 3 and 4. When the cam follower 39 is on the "dwell" portion 15a of the cam, the article contact element 16 will be held in its retracted position, shown best in Fig. 1, against the action of the coil spring 32. However, when the cam follower 39 rides from the "dwell" portion 15a down the inclined side of the arcuately curved camming portion 15b, the spring 32 may act to move the article contact element 16 of the transfer mechanism across the station A of the first dead plate section and this movement will be sufficient to push an article of glassware from the first dead plate section to station B on the second dead plate section. The article contact element 16 of the transfer mechanism just described, which for convenience may be termed the first transfer mechanism of the device, will be returned to its inactive position against the force of the spring 32 by the linkage and lever mechanism just described as the cam follower 39 rides up the inclined side of the part 15b of the cam 15 onto the "dwell" portion 15a thereof.

The transfer mechanism for moving the article of glassware from station B onto the conveyor 2 may for convenience and brevity be termed the second transfer mechanism of the device. This second transfer mechanism comprises an article contact element 40, similar to the contact element 16, having an attaching sleeve or collar portion 41 fastened, as by a set screw 42, on a rod 43 in adjusted position along the latter. An end portion of the rod 43 lies in a longitudinal groove 44 in a block 45 of a holder, generally designated 46, being held in place against the block by a clamping plate 47. The block 45 may be integral with or carried by one end of an attaching arm 48 which has its opposite end portion removably secured on a vertically disposed, short, rock shaft 49, as by means of a nut 50. The rod 43, holder 46 and attaching arm 48 comprise an oscillatory transfer arm, carrying the article contact element 40.

The rock shaft 49 may be rotatably supported in an upright position by a suitable part of the bracket or frame structure 5. Also fastened to this rock shaft 49 is a second arm, designated 51, which is connected by a link 52 to one end of an arm 53, as best seen in Figs. 1 and 5. The arm 53 is fast to an intermediate portion of a second upright, short, rock shaft 54. See Figs. 2 and 6. This shaft likewise may be suitably mounted in a suitable portion of the bracket or frame structure 5. The rock shaft 54 is turned about its axis in response to oscillations of a lever 55 which is fast at one end on the shaft 54 and carries, at its opposite end, a cam follower 56 which is held against the cam surface of the cam 14 by a coil spring 57. One end of this coil spring is attached to an intermediate portion of the arm 55, as at 58, Figs. 1 and 5, while the opposite end of the coil spring is attached, as at 59, Fig. 1, to a fixed attaching element of the stationary bracket or framework structure. When the cam follower 56 is on the "dwell" portion 14a of the cam 14, as shown in Figs. 1, 2, 5 and 6, the article contact element of the second transfer mechanism will be held in its retracted position, as shown best in Fig. 1. When the cam follower rides down the inclined side of the part 14b of the cam 14, the spring 57 will act to cause the article contact element to swing in an arc across the station B towards the conveyor 2 so as to push the article of glassware from the second cooling plate section onto the conveyor 2.

The cam shaft 13 is shown as provided with a sprocket 60, representing any transmission means for rotating the cam shaft in the direction and at the speed required to coordinate the operations of the transfer mechanisms with those of associate mechanisms. The particular mechanism for driving the cam shaft 13 may be as shown in the aforesaid Ingle Patent 1,921,390, which shows a driving mechanism constructed and arranged to coordinate the cam shaft operation with the operations of the glassware take-out mechanism and with the movements of the conveyor 2.

In the event that it is desired to transfer articles of glassware from the first cooling dead plate section directly to the conveyor 2, the second transfer mechanism may be adapted for this purpose conveniently and with the use of but few additional parts. Thus, an article contact element 61, similar to the part 40, on a supporting rod 62 projecting from and carried by a holder 63 on an end portion of a relatively long attaching arm 64 may then be used in lieu of the corresponding parts of the shorter transfer arm of the second transfer mechanism as hereinbefore described. The other end portion of the attaching arm 64 is made fast on the projecting upper end portion of the vertical rock shaft 54, being removably held thereon, as by a nut 65. This will position the contact element 61 suitably for movement across the station A on the first dead plate section when the rock shaft 54 is permitted to turn by cam 14 under actuation of the spring 57. To restore the second transfer mechanism to condition for use to move articles of glassware from the second dead plate section to the conveyor, it only is necessary to remove the relatively long transfer arm from the rock shaft 54 and to replace the shorter transfer arm.

Other forms of transfer mechanism may be used in lieu of those shown on the accompanying drawings and herein particularly described by way of example. The details of the illustrative apparatus may be modified or altered in ways which will now readily suggest themselves to those skilled in the art and I, therefore, do not wish to be limited to such details.

I claim:

1. In glassware handling apparatus, a dead plate comprising a pair of sections adjacent to each other and to a conveyor, means operable to cool glassware on each of said sections, and glassware transfer means including two upright rock shafts adjacent to one of said sections, means to rock said shafts in unison about their respective axes, a first glassware transfer arm removably mounted on one of said shafts for operation thereby to move articles of glassware periodically from one of said dead plate sections onto the conveyor, and another glassware transfer arm removably mounted on the second rock shaft for operation by the latter to move articles of glassware periodically from the second dead plate section onto said conveyor when said first arm is removed, and means for transferring glassware from one deadplate section to another deadplate section approximately simultaneously with operation of one of said transfer arms.

2. In glassware handling apparatus, a dead plate comprising a pair of sections adjacent to each other and to a conveyor, means operable to cool glassware on each of said sections, and glassware transfer means including two upright rock shafts adjacent to one of said sections, means to rock said shafts in unison about their respective axes, a relatively short glassware transfer arm detachably mounted on one of said shafts for operation thereby to move articles of glassware from the adjacent dead plate section onto the conveyor, and a longer glassware transfer arm detachably mounted on the second rock shaft for operation by the latter to move articles of glassware from the more remote dead plate section onto said conveyor, said arms being selectively mounted on their respective rock shafts, and means for transferring glassware from said remote section to said nearer section substantially simultaneously with operation of said short transfer arm.

3. In glassware handling apparatus, a conveyor for glassware, a stationary dead plate formed and arranged to provide a first fixed station to which each article of glassware produced by an adjacent glassware forming mold may be delivered when taken out of the mold and a second fixed station adjacent to the first to which glassware may be moved from said first station and from which said glassware may be moved onto said conveyor, means for approximately concurrently moving one article from the first to the second station and another article from the second station to the conveyor including means for selectively moving articles directly to the conveyor from said first station, and cooling means associated with said dead plate to cool the glassware thereon at both said stations.

4. In glassware handling apparatus, a conveyor for glassware, a stationary dead plate formed and arranged to provide a first fixed station to which each article of glassware produced by an adjacent glassware forming mold may be delivered when taken out of the mold and a second fixed station adjacent to the first to which glassware may be moved from said first station and from which said glassware may be moved onto said conveyor, and a transfer mechanism operable to move glassware from said first station to said second station and concurrently from said second station to said conveyor and selectively from said first station directly to said conveyor.

References Cited in the file of this patent

UNITED STATES PATENTS

| Number | Name | Date |
| --- | --- | --- |
| 1,900,781 | Wardley | Mar. 7, 1933 |
| 2,066,283 | Wadman | Dec. 29, 1936 |
| 2,182,167 | Berthold | Dec. 5, 1939 |
| 2,282,848 | Berthold | May 12, 1942 |
| 2,375,944 | Quentin | May 15, 1945 |
| 2,413,722 | Long | Jan. 7, 1947 |